(12) United States Patent
Vijayasankar et al.

(10) Patent No.: US 10,135,492 B2
(45) Date of Patent: Nov. 20, 2018

(54) COMPATIBLE COMMUNICATION BETWEEN DEVICES USING DIFFERENT COMMUNICATION PROTOCOLS

(71) Applicant: Texas Instruments Incorporated, Dallas, TX (US)

(72) Inventors: Kumaran Vijayasankar, Dallas, TX (US); Ramanuja Vedantham, Allen, TX (US); Anuj Batra, Dallas, TX (US); Tarkesh Pande, Dallas, TX (US); Il Han Kim, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 416 days.

(21) Appl. No.: 14/072,765

(22) Filed: Nov. 5, 2013

(65) Prior Publication Data

US 2014/0126655 A1    May 8, 2014

Related U.S. Application Data

(60) Provisional application No. 61/723,578, filed on Nov. 7, 2012.

(51) Int. Cl.
*H04B 3/54* (2006.01)
*H04L 12/64* (2006.01)

(52) U.S. Cl.
CPC ............ *H04B 3/54* (2013.01); *H04L 12/6418* (2013.01); *H04B 2203/5408* (2013.01); *H04B 2203/5433* (2013.01)

(58) Field of Classification Search
CPC ....................................................... H04B 3/54
See application file for complete search history.

(56) References Cited

U.S. PATENT DOCUMENTS

2012/0236879 A1* 9/2012 Oksman .................. H04B 3/54
                                                        370/474
2013/0003879 A1* 1/2013 Balleste ................ H04W 36/14
                                                        375/257

(Continued)

OTHER PUBLICATIONS

Jim Leclare et al, "An Overview, History, and Formation of IEEE P1901.2 for Narrowband OFDM PLC", Maxim Integrated, Application Note 5676, Jul. 2, 2013, pp. 1-7.

(Continued)

*Primary Examiner* — Marcus Smith
(74) *Attorney, Agent, or Firm* — Michelle F. Murray; Charles A. Brill; Frank D. Cimino (57) ABSTRACT

In a method for communicating with a plurality of devices using different communication protocols, a signal is received at a transceiver device from a neighbor device via a physical layer of a communication media. At a first time the signal contains a header frame from a first device conforming to a first communication protocol and at another time the signal contains a header frame from a second device conforming to a second communication protocol. The transceiver determines which of the different communication protocols is being used by each of the plurality of devices. The transceiver may then process inbound payload data using the indentified protocol type. Data frames are transmitted to the first device using the first communication protocol and data frames are transmitted to the second device using the second communication protocol.

20 Claims, 5 Drawing Sheets

(56) References Cited

U.S. PATENT DOCUMENTS

2013/0051264 A1* 2/2013 Wang .................... H04L 5/0098
370/252
2014/0036702 A1* 2/2014 Van Wyk ................. H04B 3/46
370/252

OTHER PUBLICATIONS

"PLC G3 MAC Layer Specification",PLC G3 OFDM, Electricite Reseau Distribution France (ERDF), pp. 1-138.
PLC G3 Physical Layer Specification, PLC G3 OFDM, Electricite Reseau Distribution France (ERDF), pp. 1-46.

* cited by examiner

| OCTETS: 2 | 1 | 0/2 | 0/2/8 | 0/2 | 0/2/8 | 0/5/6/10 | VARIABLE | VARIABLE | 2 | |
|---|---|---|---|---|---|---|---|---|---|---|
| FRAME CONTROL | SEQ. NO | DEST. PAN | DEST. ADR | SOURCE PAN | SOURCE ADDRESS | AUX. SECURITY HEADER | INFORMATION ELEMENTS | FRAME PAYLOAD | FCS | |
| | | | | | | | HIE / PIE | | | |
| MHR | | | | | | | | MPDU PAYLOAD | | MFR |

| OCTETS: 3 | 2 | 1 | 0/2 | 0/2/8 | 0/2 | 0/2/8 | 0/5/6/10 | VARIABLE | VARIABLE | 2 | |
|---|---|---|---|---|---|---|---|---|---|---|---|
| SEGMENT CONTROL | FRAME CONTROL | SEQ. NO. | DEST. PAN | DEST. ADR | SOURCE PAN | SOURCE ADDRESS | AUX. SECURITY HEADER | INFORMATION ELEMENTS | FRAME PAYLOAD | FCS | |
| | | | | | | | | HIE / PIE | | | |
| 422 | MHR | | | | | | | | MPDU PAYLOAD | | MFR |

COMPATIBLE COMMUNICATION BETWEEN DEVICES USING DIFFERENT COMMUNICATION PROTOCOLS

CLAIM OF PRIORITY UNDER 35 U.S.C. 119(e)

The present application claims priority to and incorporates by reference U.S. Provisional Application No. 61/723,578, filed Nov. 7, 2012, entitled "IEEE p1901 MAC Backward Compatibility with G3."

FIELD OF THE INVENTION

This invention generally relates to compatible communication between devices using different communication protocols, and in particular to communication over power lines.

BACKGROUND OF THE INVENTION

Power Line Communication (PLC) is one of the technologies used for automatic meter reading, for example. Both one-way and two-way systems have been successfully used for decades. Interest in this application has grown substantially in recent history because utility companies have an interest in obtaining fresh data from all metered points in order to better control and operate the utility grid. PLC is one of the technologies being used in Advanced Metering Infrastructure (AMI) systems.

A PLC carrier repeating station is a facility at which a PLC signal on a power line is refreshed. The signal is filtered out from the power line, demodulated and modulated, and then re-injected onto the power line again. Since PLC signals can carry long distances (several 100 kilometers), such facilities typically exist on very long power lines using PLC equipment.

In a one-way system, readings "bubble up" from end devices (such as meters), through the communication infrastructure, to a "master station" which publishes the readings. A one-way system might be lower-cost than a two-way system, but also is difficult to reconfigure should the operating environment change.

In a two-way system, both outbound and inbound traffic is supported. Commands can be broadcast from a master station (outbound) to end devices, such as meters, that may be used for control and reconfiguration of the network, to obtain readings, to convey messages, etc. The device at the end of the network may then respond (inbound) with a message that carries the desired value. Outbound messages injected at a utility substation will propagate to all points downstream. This type of broadcast allows the communication system to simultaneously reach many thousands of devices. Control functions may include monitoring health of the system and commanding power shedding to nodes that have been previously identified as candidates for load shed. PLC also may be a component of a Smart Grid.

The power line channel is very hostile. Channel characteristics and parameters vary with frequency, location, time and the type of equipment connected to it. The lower frequency regions from 10 kHz to 200 kHz are especially susceptible to interference. Furthermore, the power line is a very frequency selective channel. Besides background noise, it is subject to impulsive noise often occurring at 50/60 Hz, and narrowband interference and group delays up to several hundred microseconds.

OFDM is a modulation technique that can efficiently utilize this limited low frequency bandwidth, and thereby allows the use of advanced channel coding techniques. This combination facilitates a very robust communication over a power line channel.

On Sep. 30, 2010, the IEEE's 1901 Broadband Powerline Standard was approved and HomePlug AV, as baseline technology for the FFT-OFDM PHY within the standard, is now ratified and validated as an international standard. The HomePlug Powerline Alliance is a certifying body for IEEE 1901 products. The three major specifications published by HomePlug (HomePlug AV, HomePlug Green PHY and HomePlug AV2) are interoperable and compliant.

Another set of open standards has been developed for power line communication (PLC) at the request of Electricité Réseau Distribution France (ERDF), a wholly owned subsidiary of the EDF (Electricité de France) Group. The set of standards include "PLC G3 Physical Layer Specification," undated, ERDF, which is incorporated by reference herein; and "PLC G3 MAC Layer Specification," undated, ERDF, which is incorporated by reference herein. These standards are intended to facilitate the implementation of an automatic meter-management (AMM) infrastructure in France; however, PLC using these standards or similar technology may be used by power utilities worldwide.

The G3 standards promote Interoperability and coexists with IEC 61334, IEEE® P1901, and ITU G.hn systems. 10 kHz to 490 kHz operation complies with FCC, CENELEC, and ARIB. CENELEC is the European Committee for Electrotechnical Standardization and is responsible for standardization in the electro technical engineering field. ARIB is a Japanese standards organization.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description Power line communication using G3 standards reduces infrastructure costs by allowing transmission on medium voltage lines, for example, 12 kV, for distances of 6 km or more and across transformers with fewer repeaters. Robust operation over noisy channels is provided by an orthogonal frequency division multiplexing (OFDM)-based PHY (physical) layer. The G3 Mac specification is based on the IEEE 802.15.4-2006 "Wireless Medium Access Control (MAC) and Physical Layer (PHY) Specifications for Low-Rate Wireless Personal Area Networks (WPANs)" which is suitable for lower data rates. Two layers of forward error correction and cyber security features are provided. A 6LoWPAN adaptation layer supports IPv6 packets. An AES-128 cryptographic engine may be included in G3 PLC nodes. Adaptive tone mapping maximizes bandwidth utilization and channel estimation optimizes modulation between neighboring nodes. A mesh routing protocol selects best path between remote nodes.

At the MAC layer, a data or command frame may include up to 400 bytes of data. At the PHY layer, a frame may be segmented and transmitted in smaller chunks of data. The segment size may vary based on transmission channel interference and retry operations. The G3 PLC standard does not clearly indicate how the segmented frames are to be transmitted.

IEEE standard P1901.2 specifies communications for low frequency (less than 500 kHz) narrowband power line devices via alternating current and direct current electric power lines. This standard supports indoor and outdoor communications in the following environments: a.) low voltage lines (less than 1000 v), such as the line between a utility transformer and meter; b) through transformer low-voltage to medium-voltage (1000 V up to 72 kV); and c) through transformer medium-voltage to low-voltage power lines in both urban and in long distance (multi-kilometer) rural communications. The standard uses transmission frequencies less than 500 kHz. Data rates will be scalable to 500 kbps depending on the application requirements. This standard addresses grid to utility meter, electric vehicle to charging station, and within home area networking communications scenarios. Lighting and solar panel power line communications are also potential uses of this communications standard. This standard focuses on the balanced and efficient use of the power line communications channel by all classes of low frequency narrow band (LF NB) devices, defining detailed mechanisms for coexistence between different LF NB standards developing organizations (SDO) technologies, assuring that desired bandwidth may be delivered. This standard assures coexistence with broadband power line (BPL) devices by minimizing out-of-band emissions in frequencies greater than 500 kHz. The standard addresses the necessary security requirements that assure communication privacy and allow use for security sensitive services. This standard defines the physical layer and the medium access sub-layer of the data link layer, as defined by the International Organization for Standardization (ISO) Open Systems Interconnection (OSI) Basic Reference Model.

IEEE P1901.2 was based on G3 but has several additional features that make it not backward compatible with G3-PLC. That is, devices that use either one of the standards could both could separately coexist in the same environment, but cannot communicate with each other. There are a large number of G3 based devices already installed worldwide. However, IEEE P1901.2 devices have additional features and capabilities that may make them attractive over G3 devices for various applications. Embodiments of the invention allow devices that use the IEEE p1901.2 communication protocol to also communicate in a compatible manner with devices that use the G3 communication protocol, as will be explained in more detail below.

Figure 1:
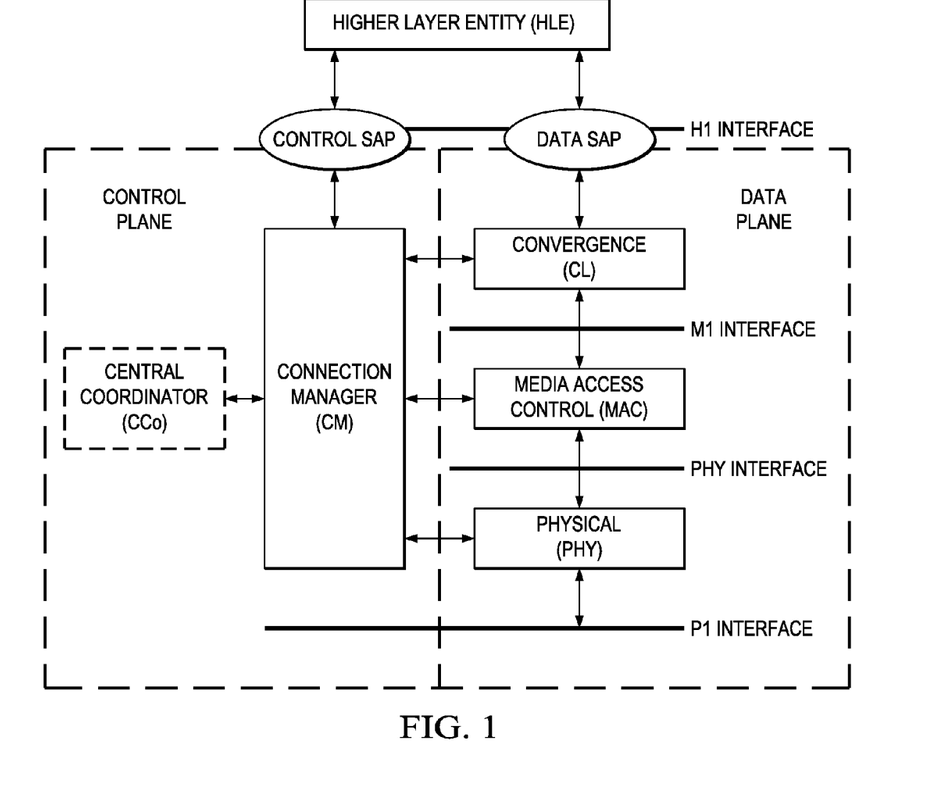
FIG. 1 is an architectural diagram of a power line communication system, illustrating the PHY and MAC layers used for interoperability.

FIG. 1 shows an architectural diagram of a PLC system that may include both G3 devices and P1901.2 devices. The Higher Layer Entities (HLEs) above the H1 (Host) Interface may be bridges, applications or servers that provide off-chip services to clients below the H1 Interface. The Data Service Access Point (SAP) accepts Ethernet format packets, so all IP based protocols are easily handled. The Architecture defines two planes as shown in FIG. 1. The data plane provides the traditional layered approach with the M1 interface between the Convergence Layer (CL) and the MAC, and the PHY interface between the MAC and the PHY. In the control plane, the MAC is a monolith without conventional layering. In FIG. 1 it is labeled as the Connection Manager (CM) since that is its primary function. The approach adopted for the control plane was chosen to provide more efficient processing and to provide implementers greater flexibility for innovation. Although part of the control plane is in all stations, the Central Coordinator (CCo) entity may be active in only one station in a single PLC network.

In order to better understand embodiments of the invention, an overview of IEEE P1901.2 will now be described. Additional details may be found in various IEEE documents. A more detailed overview is provided in "An Overview, History, and Formation of IEEE P1901.2 for Narrowband OFDM PLC", Jul. 2, 2013, which is incorporated by reference herein.

Details on PHY building blocks have been presented in various IEEE publications. The ultimate result is now a universal PHY structure for NB PLC. The fundamental PHY elements in the transceiver start with the scrambler. The scrambler's function is to randomize the incoming data. Both G3-PLC and PRIME utilize the same generator polynomial, as illustrated in equation 1.

$$s(x)=x^7+x^4+1 \qquad \text{Eq 1}$$

Two levels of error correction follow, starting with a Reed-Solomon (RS) encoder where typically data from the scrambler is encoded by shortened systematic Reed-Solomon (RS) codes using Galois Field (GF). The second level of error correction, employed by both G3-PLC and PRIME, uses a ½ rate convolutional encoder with constraint rate K=7. The convolutional encoder is followed by a two-dimensional (time and frequency) interleaver. Together these blocks significantly improve robustness and overall system performance in the presence of noise.

Following the FEC is the OFDM modulator. The modulation technique of PRIME and G3-PLC was selected to be used in IEEE P1901.2. The defined modulator describes the modulation (BPSK, QPSK, 8PSK, etc.); the constellation mapping; the number of repetitions (4, 6, etc.); the type of modulation (differential, coherent); the frequency domain pre-emphasis; OFDM generation (IFFT, with cyclic prefix); and windowing.

Structure of the physical frames is defined according to the fundamental system parameters, including the number of FFT points and overlapped samples, the size of cyclic prefixes, the number of symbols in the preamble, and the sampling frequency. The physical layer supports two types of frames: the data frame and the ACK/NACK frame. Each frame starts with a preamble used for synchronization and detection, as well as automatic gain control (AGC) adaptation. The preamble is followed by data symbols allocated to the frame control header (FCH) with the number of symbols depending on the number of carriers used by the OFDM modulation.

The FCH is a data structure transmitted at the beginning of each data frame. It contains information regarding modulation and the length of the current frame in symbols. The FCH also includes a frame control checksum (CRC, or cyclic redundancy check), which is used for error detection. The size of the CRC depends on the frequency band being utilized.

The PHY layer includes an adaptive tone mapping (ATM) feature to optimize maximum robustness. The added ATM feature is implemented first by estimating the SNR of the received signal subcarriers (tones), and then adaptively selecting the usable tones and the optimum modulation and coding type to ensure reliable communication over the powerline channel. Tone mapping also specifies the power level for the remote transmitter and the gain values to be applied for the various sections of the spectrum. The per-carrier quality measurement enables the system to adaptively avoid transmitting data on subcarriers with poor quality. Using a tone map indexing system, the receiver understands which tones are used by the transmitter to send data and which tones are filled with dummy data to be ignored. The goal of the ATM is to achieve the greatest possible throughput under the given channel conditions between the transmitter and the receiver.

A transmission protocol between the MAC and the PHY layer includes different data primitives accessible between the MAC and PHY layers. Three primitives are provided. The PD-DATA.request primitive is generated by a local MAC sublayer entity and issued to its PHY entity to request the transmission of a PHY service data unit (PSDU). The PD-DATA.confirm primitive confirms the end of the transmission of a PSDU from the local PHY entity to a peer PHY entity. The PD-DATA.indication primitive indicates the transfer of a PSDU from the PHY to the local MAC sublayer entity. The PHY layer includes a management entity called the PLME (physical layer management entity). The PLME provides layer-management service interfaces functions. It is also responsible for maintaining the PHY information base.

The PLME-SET.request/confirm and PLME-GET.request/confirm primitives allow access to the PHY IB parameters. The PLME-SET-TRX-STATE. Request/confirm primitives control the state of the PHY TX/RX. The PLME-CS.request/confirm primitives get the media status using physical carrier sense.

The MAC layer is an interface between the logical link control (LLC) layer and the PHY layer. The MAC layer regulates access to the medium by using CSMA/CA. It provides feedback to upper layers in the form of positive and negative acknowledgements (ACK or NACK) and also performs packet fragmentation and reassembly. Packet encryption/decryption is carried out by the MAC layer as well.

A tone map response MAC command is provided to utilize adaptive tone mapping. The MAC sublayer generates a tone map response command if the tone map request (TMR) bit of a received packet segment control field is set. This means that a packet originator has requested tone map information from a destination device. The destination device must estimate this particular communication link between two points and report the optimal PHY parameters. The tone map information includes the index associated with PHY parameters: the number of used tones and allocation (tone map), the modulation mode, the TX power control parameters, and the link quality indicator (LQI).

Every device must maintain a Neighbor Table that contains information for all devices that can be communicated with directly. A neighbor table element is created once a frame is received from a neighbor device and updated with optimum PHY transmission parameters as soon as a tone map response command is received. This table must be accessible by the adaptation and MAC sublayers. Each entry of this table may contain the TX parameters (tone map, modulation, TX gain) that can be used to communicate with the neighbor device.

The Physical Layer (PHY) may operate in the frequency range of less than 500 kHz and provide up to 500 kbps PHY channel rate. A connection-oriented contention free (CF) service based on periodic Time Division Multiple Access (TDMA) allocations of adequate duration is provided to support the QoS requirements of a connection. A connectionless, prioritized contention based service may be provided to support both best-effort applications and applications that rely on prioritized QoS. This service is based on Collision Sense Multiple Access/Collision Avoidance (CSMA/CA) technology.

To efficiently provide both kinds of communication service, a flexible, centrally-managed architecture may be provided. The central manager is called a Central Coordinator (CCo). The CCo establishes a Beacon Period and a schedule which accommodates both the Contention Free allocations and the time allotted for Contention-based traffic.

Figure 2:
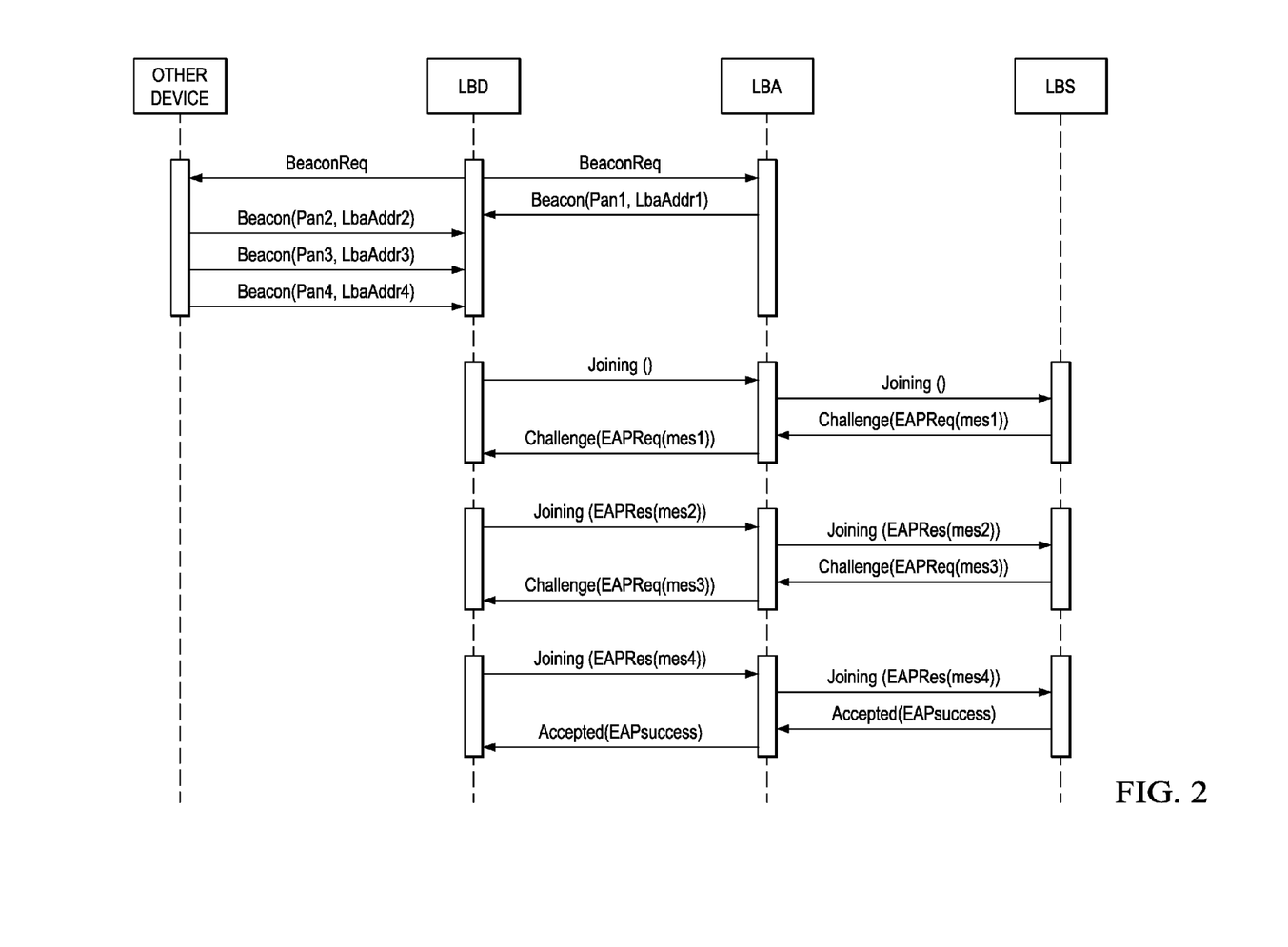
FIG. 2 is a ladder chart illustrating operation of devices in the beacon period.

FIG. 2 is a ladder chart showing the joining procedure. A device intending to join the network would send a beacon request. Devices that are already part of the network would send a beacon. The beacon frame contains the PAN Id and route cost (cost for reaching the PAN coordinator) from this node. The remaining messages illustrate the joining message sequence as defined in the 6LoWPAN LBP IETF specification. For two different protocols to be compatible at the MAC layer, they need to understand the beacon frames of each other.

In order to better understand embodiments of the invention, various aspects of G3 will now be described in more detail. IEEE 1901.2 is similar in many ways to G3; however, 1901.2 includes several enhanced features that prevent compatible communication between 1901.2 devices and G3 devices. In order to be compatible with G3, a P1901.2 native device needs to observe or accommodate certain G3 differences, as will be described below.

Figure 3:
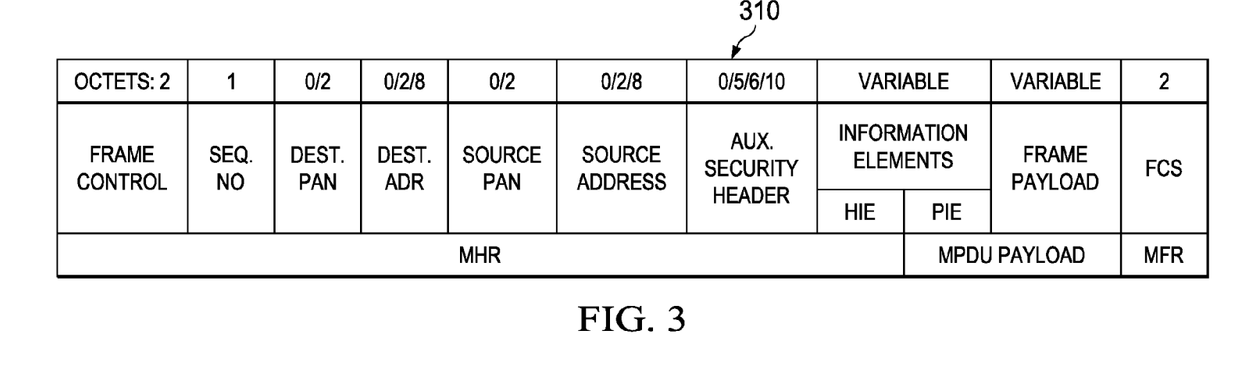
FIGS. 3 and 4 illustrate MAC frame configurations.
Figure 4:
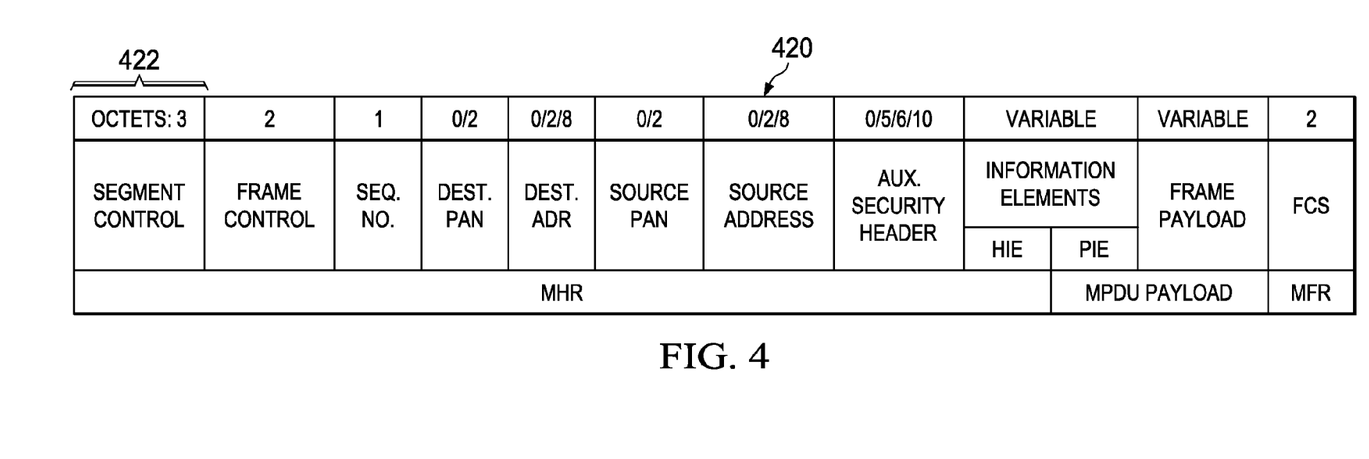

FIGS. 3 and 4 illustrate MAC frame configurations. FIG. 3 illustrates frame 310 that conforms to IEEE p1901.2. Frame 310 is different from MAC frames used by the G3 standard, therefore an IEEE p1901.2 device cannot communicate with a G3 device.

FIG. 4 illustrates MAC frame configuration 420 in which a segment control field 422 is included. MAC frame 420 is compatible with G3 MAC frames; therefore, in an embodiment of the invention an IEEE p1902.1 device that uses MAC frame 420 in place of MAC frame 310 may be able to communicate with a G3 device as long as various limitations are followed, as described in more detail below.

Fundamental System Parameters

G3 PLC supports the portion between 35.9 kHz to 90.6 kHz of the CELENEC-A band. An OFDM with DBPSK and DQPSK modulation schemes per carrier is selected to support up to 33.4 kbps data rate in Normal mode of operation. The DBPSK (differential binary phase shift keying) and DQPSK (differential quadrature phase shift keying) modulation for each carrier makes the receiver design significantly simpler since no tracking circuitry is required at the receiver for coherently detecting the phase of each carrier.

Instead, the phases of carriers in the adjacent symbol are taken as reference for detecting the phases of the carriers in the current symbol.

IEEE P1901.2 uses a slightly different form of modulation, making use of +/− phase shifts. Based on the phase shift of the preamble constellation, the frame can be identified as being from a G3 device or an IEEE P1901.2 device. One method to do this may be by accumulating the real and imaginary components over the header and across the tones and see which is larger. If it is real, then it is G3 and if it is imaginary, then it is P1901.2.

A receiver may try demodulating a received signal using both the G3 and the IEEE 1901.2 scheme to determine which modulation scheme is being used on a particular header frame. This may allow a receiver to determine which type of protocol is being used and thereby determined if it should communicate using G3 protocols or IEEE P1901.2 protocol.

There is potential to use the G3 standard to support communication in frequencies up to 180 kHz. As a result, the sampling frequency at the transmitter and receiver is selected to be 0.4 MHz in order to provide some margin above the Nyquist frequency for signal filtering in the transmitter (for PSD shaping to remove the signal images) and at the receiver (for band selection and signal enhancement).

The maximum number of carriers that can be used is defined to be 128, resulting in an IFFT size of 256. This results in a frequency spacing between the OFDM carriers equal to 1.5625 kHz*(Fs/N), where Fs is the sampling frequency and N is the IFFT size. Note that an imperfection such as sampling clock frequency variation can cause Inter Carrier Interference (ICI). In practice, the ICI caused by a typical sampling frequency variation of about 2% of the frequency spacing, is negligible. In other words, considering ±20 ppm sampling frequency in transmitter and receiver clocks, the drift of the carriers is approximately equal to 8 Hz, which is approximately 0.5% of the selected frequency spacing. Considering these selections, the number of usable carriers for the CELENEC A band is 36, with a first carrier frequency of 35.938 kHz and a last carrier frequency of 90.625 kHz.

The system works in two different modes, namely Normal and Robust modes. In Normal mode, the FEC is composed of a Reed Solomon encoder and a convolutional encoder. The system also supports Reed Solomon code with parity of 8 and 16 Bytes.

In Robust mode the FEC is composed of Reed Solomon and convolutional encoders followed by a Repetition Code (RC). The RC code repeats each bit four times, making the system more robust to channel impairments. This of course will reduce the throughput by about factor of four.

The number of symbols in each PHY (Physical Layer) frame is selected based on two parameters, the required data rate and the acceptable robustness.

CSMA/CA

The channel access is accomplished by using the Carrier Sense Multiple Access with Collision Avoidance (CSMA/CA) mechanism with a random backoff time. The random backoff mechanism spreads the time over which stations attempt to transmit, thereby reducing the probability of collision. Each time a device wishes to transmit data frames, it should wait for a random period. If the channel is found to be idle, following the random backoff, the device may then transmit its data. If the channel is found to be busy following the random backoff, the device waits for another random period before trying to access the channel again.

The current G3 specification supports only an unslotted version of the CSMA-CA algorithm for non-beacon PAN described in IEEE 802.15.4. The random backoff mechanism spreads the time over which stations attempt to transmit, thereby reducing the probability of collision, using a truncated binary exponential backoff mechanism.

Carrier sense is a fundamental part of the distributed access procedure. Physical Carrier Sense (PCS) is provided by the PHY layer upon detection of a preamble in the frame control header. In the latter case, a PCS signal is asserted long enough to be detected and a Virtual Carrier Sense (VCS) is asserted by the MAC. A virtual carrier sense mechanism is provided by the MAC by tracking the expected duration of channel occupancy. Virtual carrier sense is set by the length of received packet or upon collision. In these cases, virtual carrier sense tracks the expected duration of the busy state of the medium. The medium is to be considered Busy when the station is transmitting.

A VCS timer is maintained by all stations to improve reliability of channel access. The VCS timer is set based on received long (data) or short (ACK) frames. The VCS timer is also set upon collision or when the station powers up. Stations use this information to compute the expected busy condition of the medium or the expected duration of the Contention State and store this information in the VCS timer.

A Collision occurs in each of the following circumstances: the transmitting station receives a something other than ACK or NACK response when a response is expected. The transmitting station must infer a Collision from the absence of any response to a transmission when a response is expected. Note that the absence of a response could also be the result of a bad channel. Since there is no way to distinguish between the two causes a Collision is inferred.

Segmentation and Reassembly Overview

The G3 PHY specification supports different types of modulation and tone maps. Therefore, a number of data bytes of PHY payload can be changed dynamically based on channel condition. This requires implementing MAC payload fragmentation on the MAC sub-layer. If the MAC payload is too large to fit wholly within an MSDU (MAC service data unit), it must be partitioned into smaller segments that can each fit within an MSDU. This process of partitioning MAC frame into MSDUs is called segmentation. The segmentation may require adding padding bytes to the last segment in order fill the last PHY frame. The reverse process is called reassembly. The segmentation improves the probability of delivery over harsh channels and contributes to better latency characteristics for all stations by restricting the length of each individual transmission.

All forms of addressed delivery (unicast, multicast, and broadcast) are subject to segmentation. Acknowledgments and retransmissions occur independently for each segment. The Segment Control fields: SL, SC, and LSF are used to keep track of segments of fragmented packet and assembly whole packet on receiver side.

An IEEE 1901.2 native device may retransmit from a lost segment after a failure when it knows that the receiving node is also an IEEE 1901.2 device. In an embodiment of the invention, in order to be compatible with a G3 device, by default a 1901.2 native node may be restricted to start from the first segment after failure unless it knows the receiving device is also an IEEE 1901.2 device.

An IEEE 1901.2 device may include various information elements in various frames. For example, the information elements in a Beacon frame may be a service set identity (SSID), the supported rates, one or more PHY parameter sets, an optional contention-free parameter set, an optional IBSS parameter set, and an optional traffic indication map. G3 does not support information elements; therefore, in an embodiment of the invention to maintain G3 compatibility, a native 1901.2 device will be restricted to not use information elements unless it knows it is communicating with another 1901.2 device.

An IEEE 1901.2 device may send MAC data frames that are greater in length then 400 bytes, while a G3 device is limited to a maximum of 400 bytes. Therefore, in an embodiment of the invention to maintain G3 compatibility, a native 1901.2 device will not use more than 400 bytes per MAC data frame unless it knows it is communicating with another 1901.2 device.

G3 devices include a one or two byte payload field to carry route cost information. In an embodiment of the invention, in order for an IEEE P1901.2 native device to understand G3 beacons, it may be configured to process the payload field in a G3 beacon.

Figure 5:
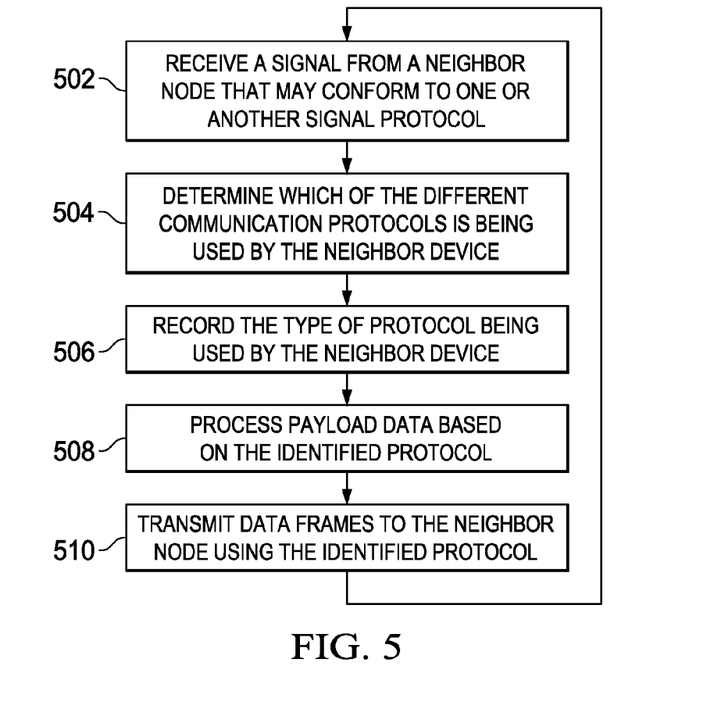
FIG. 5 is a flow chart illustrating operation of G3 and P1901.2 compatible communication between devices.

FIG. 5 is a flow chart illustrating operation of G3 and P1901.2 compatible communication between neighboring devices. A transceiver device may receive 502 a signal from a neighbor device via a physical layer of a communication media. At one point in time the signal may contain a header frame from a first device conforming to a first communication protocol and at another time the signal may contain a header frame from a second device conforming to a second communication protocol. For example, the transceiver device may receive a G3 protocol signal from one neighbor at one time, and then receive an IEEE P1901.2 protocol signal from a second neighbor at a different time.

As each signal is being received, the transceiver determines 504 which of the different communication protocols is being received from each neighbor device. The transceiver may determine which communication protocol is being used by demodulating the signal using a demodulation scheme associated with each protocol. Successful demodulation will then indicate which protocol is being received. In another embodiment, a receiver may determine what type of protocol is being received by accumulating the real and imaginary components over the header and across the tones and see which is larger. If it is real, then it is G3 and if it is imaginary, then it is P1901.2.

The transceiver may record 506 the type of protocol being used by each device in a neighbor table, for example. As described earlier, every participating device in the system may maintain a neighbor table that contains information for all devices that can be communicated with directly. A neighbor table element is created once a frame is received from a neighbor device and updated with optimum PHY transmission parameters as soon as a tone map response command is received. This table should be accessible by the adaptation and MAC sublayers. Each entry of this table may contain the TX parameters (tone map, modulation, TX gain) that can be used to communicate with the neighbor device, for example.

The transceiver may then process 508 the payload data that was included in the received signal from the neighbor device using the identified type of communication protocol. This may involve using one set of logic functions and state machines for one protocol, such as G3, and a different set of logic functions and state machines for the other protocol, such as P1910.2, for example.

The transceiver may then transmit 510 data to the neighbor device using the identified protocol. Each time the transceiver is ready to transmit additional data to a neighbor device, it may check the neighbor table, for example, to determine which communication protocol to use while transmitting to that neighbor node.

While transmitting to a neighbor node, the transceiver may use all features of a fully featured protocol when the neighbor node is the same type of node as the transceiver. When the node is a different type, then the transceiver may use a subset of features that is compatible with the neighbor node. For example, when two IEEE P19021.2 devices are communicating, they may use more than 400 bytes of data/frame; they may provide information elements in certain frames; and they may retransmit data after a failure beginning at a lost segment. However, when a 1901.2 device is transmitting to a G3 device, then the 1901.2 device will limit its transmissions to a maximum of 400 bytes/frame; the 1901.2 device will not provide information elements in frames; and the 1901.2 device will retransmit data after a failure starting from a first segment of the transmission, for example.

Figure 6:
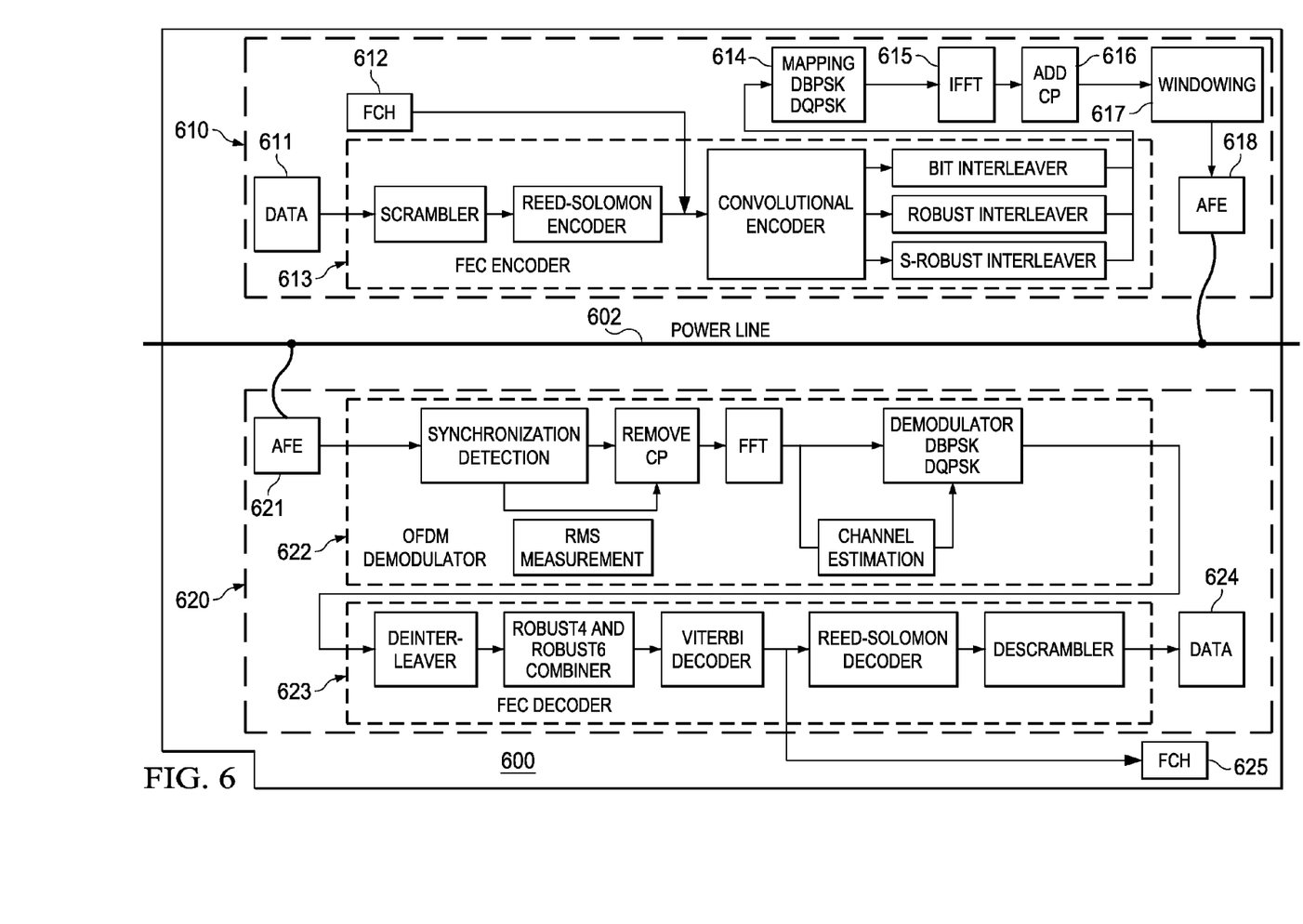
FIG. 6 illustrates a block diagram of an exemplary low cost, low power G3 and P1901.2 compatible device.

FIG. 6 is a block diagram of an exemplary low cost, low power G3 and P1901.2 compatible device 600 illustrating an OFDM transmitter 610 and receiver 620 for use in a power line communication node for PLC over a power line 602. The power line channel is very hostile. Channel characteristics and parameters vary with frequency, location, time and the type of equipment connected to it. The lower frequency regions from 10 kHz to 200 kHz used in G3 PLC and in IEEE P1901.2 are especially susceptible to interference. Furthermore, the power line is a very frequency selective channel. Besides background noise, it is subject to impulsive noise often occurring at 50/60 Hz, and narrowband interference and group delays up to several hundred microseconds.

As described in more detail above, OFDM is a modulation technique that can efficiently utilize the limited bandwidth specified by CENELEC and IEEE P1901.2, and thereby allows the use of advanced channel coding techniques. This combination facilitates a very robust communication over a power line channel.

The CENELEC bandwidth is divided into a number of sub-channels, which can be viewed as many independent PSK modulated carriers with different non-interfering (orthogonal) carrier frequencies. Convolutional and Reed-Solomon coding provide redundancy bits allowing the receiver to recover lost bits caused by background and impulsive noise. A time-frequency interleaving scheme may be used to decrease the correlation of received noise at the input of the decoder, providing diversity.

Data 611 and a frame control header 612 are provided by an application via a media access layer (MAC) of the communication protocol. An OFDM signal is generated by performing IFFT (inverse fast Fourier transform) 615 on the complex-valued signal points that are produced by differentially encoded phase modulation from forward error correction encoder 613 using Reed Solomon encoding. Tone mapping 614 is performed to allocate the signal points to individual subcarriers. An OFDM symbol is built by appending a cyclic prefix (CP) 616 to the beginning of each block generated by IFFT 615. The length of a cyclic prefix is chosen so that a channel group delay will not cause successive OFDM Symbols or adjacent sub-carriers to interfere. The OFDM symbols are then windowed 617 and impressed on power line 602 via analog front end 618. AFE 618 provides isolation of transmitter 610 from the 50/60 Hz power line voltage.

Similarly, receiver 620 receives OFDM signals from power line 602 via AFE 621 that isolates receiver 620 from the 50/60 HZ power line voltage. OFDM demodulator 622 removes the CP, converts the OFDM signal to the time domain using FFT (Fast Fourier Transform), and performs demodulation of the phase shift keyed (DBPSK, DQPSK) symbols. FEC decoder 623 performs error correction using Reed Solomon decoding and then descrambles the symbols to produce received data 624. Frame control header 625 information is also produced by FEC decoder 620, as defined by the G3 and IEEE P1901.2 PLC standards.

A blind channel estimation technique is used for link adaptation. Based on the quality of the received signal, the receiver decides on the modulation scheme to be used, as defined in the PLC standards. Moreover, the system differentiates the subcarriers with bad SNR (signal to noise ratio) and does not transmit data on them.

Transmitter 610 and receiver 620 may be implemented using a digital signal processor (DSP), or another type of microprocessor, that is executing control software instructions stored in memory that is coupled to the microprocessor, for example, to perform FEP encoding, mapping and OFDM modulation, demodulation and FEP decoding. In other embodiments, portions or all of the transmitter or receiver may be implemented with hardwired control logic, for example. The analog front ends 618, 621 require analog logic and isolation transformers that can withstand the voltage levels present on the power line.

A G3 and IEEE P1901.2 PLC system is specified to have the ability to communicate in both low voltage (LV) power lines, typically 100-240 VAC, as well as medium voltage (MV) power lines (up to approximately 12 kV, by crossing LV/MV transformers. This means that the receiver on the LV side must be able to detect the transmitted signal after it has been severely attenuated as a result of going through a MV/LV transformer. As the signal goes through the transformer it is expected to experience overall severe attenuation in its power level as well as frequency-dependent attenuation that attenuates higher frequencies. Both transmitter and receiver have mechanisms to compensate for this attenuation. The transmitter has the capability to adjust its overall signal level as well as shape its power spectrum based on tone map information provided by a target receiver, while the receiver has both an analog and digital AGC (Automatic Gain Control) in order to achieve enough gain to compensate for the overall attenuation.

A new "request/response command" may be provided that can be used by an IEEE P1901.2 device to ask a neighbor receiver about its protocol standard. A "Standard Request Message" sent from a transmitter to a neighbor receiver may be responded to with a "Standard Response Message" showing the protocol standard and the version, for example. This may be used by an IEEE P1901.2 device to identify other IEEE P1901.2 devices. This may enable future backward compatibility for later versions of IEEE P1901.2 compatible devices. In this manner, a device may explicitly request the type of protocol used by a neighbor device.

In a system where at least a portion of the devices support a request/response command as described above, when a device sends a request command, if no response is received after a specified maximum number of attempts, it may be inferred that the target device belongs to a different protocol or an older version of the present protocol

OTHER EMBODIMENTS

In the description herein, some terminology is used that is specifically defined in the G3 and IEEE p1901.2 standards and/or is well understood by those of ordinary skill in the art in PLC technology. Definitions of these terms are not provided in the interest of brevity. Further, this terminology is used for convenience of explanation and should not be considered as limiting embodiments of the invention to the G3 and IEEE 1901.2 standards. One of ordinary skill in the art will appreciate that different terminology may be used in other encoding standards without departing from the described functionality.

In another embodiment, a PHY header, a MAC header or another specified field in the protocol frame may include an identification field that may be used to indicate a protocol type or a protocol version, for example. In this case, the type of communication protocol being used by a device may be explicitly conveyed to a neighbor device by setting the identification field appropriately.

In an embodiment of the invention, a least two communication standards may be used by various devices in the system. A first communication standard may utilize a subset of features included in a second communication standard. In order for compatible communication to occur between all devices in the system, devices that natively use the second communication standard will restrict themselves to only using the subset of features included in the first communication standard. Each device will initially assume all neighbor device in the system are only capable of using the subset of features until a neighbor device has been identified to be capable of using the full set of features.

Embodiments of the receivers and transmitters and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators. A stored program in an onboard or external (flash EEP) ROM or FRAM may be used to implement aspects of the signal processing.

The techniques described in this disclosure may be implemented in hardware, software, firmware, or any combination thereof. Various combinations of hardware and/or software state machines may be used. If implemented in software, the software may be executed in one or more processors, such as a microprocessor, application specific integrated circuit (ASIC), field programmable gate array (FPGA), software state machines, or digital signal processor (DSP), for example. The software that executes the techniques may be initially stored in a computer-readable medium such as a flash drive, a compact disc (CD), a diskette, a tape, a file, memory, or any other computer readable storage device and loaded at a manufacturing site for execution in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method comprising:
   receiving, by a transceiver device from a first neighbor device via a physical layer of a communication media, a first signal;
   determining, by the transceiver device, a first communication protocol of the first signal to be power line communication (PLC) G3 or Institute of Electrical and Electronics Engineers (IEEE) 1901.2;
   transmitting first data frames from the transceiver device to the first neighbor device, using the first communication protocol;
   receiving, by the transceiver device from a second neighbor device, a second signal;
   determining, by the transceiver device, a second communication protocol of the second signal to be PLC G3 or IEEE 1901.2, wherein the first communication protocol is different from the second communication protocol; and
   transmitting second data frames from the transceiver device to the second neighbor device, using the second communication protocol.

2. The method of claim 1, further comprising storing the first communication protocol and the second communication protocol in a table.

3. The method of claim 1, wherein a first header frame of the first signal is modulated with a first modulation type, wherein determining the first communication protocol is performed based on the first modulation type.

4. The method of claim 1, further comprising processing media access control (MAC) payload data by the transceiver device based on the first communication protocol.

5. The method of claim 1, further comprising using a first state machine to process the first signal based on the first communication protocol.

6. The method of claim 1, further comprising using a first state machine to transmit the first data frames based on the first communication protocol, comprising restarting segmentation retransmission at starting points and using a MAC payload length.

7. The method of claim 1, further comprising, before receiving a frame, assuming that all nodes on a network use a simpler of the first communication protocol and the second communication protocol.

8. The method of claim 1, wherein the first communication protocol is explicitly conveyed in a portion of the first signal.

9. The method of claim 1, further comprising sending, by the transceiver device, a request command to the first neighbor device.

10. The method claim 9, further comprising determining that the first communication protocol is different than a communication protocol of the transceiver device, in response to an absence of a response to the request command.

11. The method of claim 1, wherein the transceiver device comprises a control service access point including a monolithic Medium Access Control (MAC) layer without conventional layering.

12. The method of claim 1, wherein determining the first communication protocol of the first signal comprises:
    accumulating a real component of a header of the first signal;
    accumulating an imaginary component of the header of the first signal;
    determining that the first communication protocol is PLC G3 in response to determining that the real component is greater than the imaginary component; and
    determining that the first communication protocol is IEEE 1901.2 in response to determining that the real component is less than or equal to the imaginary component.

13. A power line communication (PLC) device, comprising:
    a receiver, comprising a first analog front end configured to receive orthogonal frequency division multiplexing (OFDM) symbols from a power line;
    a transmitter, comprising a second analog front end configured to couple OFDM symbols to the power line;
    a processor coupled to the receiver and to the transmitter; and
    a non-transitory computer readable storage medium storing a program for execution by the processor, the program including instructions to:
      receive, using the receiver, a first signal from a first neighbor device via the power line;
      determine a first communication protocol of the first signal to be power line communication (PLC) G3 or Institute of Electrical and Electronics Engineers (IEEE) 1901.2;
      transmit, using the transmitter, first data frames to the first neighbor device over the power line, using the first communication protocol;
      receive, using the receiver, a second signal from a second neighbor device via the power line;
      determine a second communication protocol of the second signal to be PLC G3 or IEEE 1901.2, wherein the first communication protocol is different from the second communication protocol; and
      transmit, using the transmitter, second data frames to the second neighbor device over the power line, using the second communication protocol.

14. The PLC device of claim 13, wherein the instructions further comprise instructions to store the first communication protocol and the second communication protocol in a table.

15. The PLC device of claim 13, wherein a first header frame of the first signal is modulated with a first modulation type, and a second header frame from of the second signal is modulated with a second modulation type, and wherein the instructions to determine the first communication protocol comprise instructions to:
    attempt to demodulate the first signal using the first modulation type; and attempt to demodulate the first signal using the second modulation type.

16. The PLC device of claim 15, wherein the receiver is configured to process MAC payload data based on the first communication protocol.

17. The PLC device of claim 15, wherein the transmitter is configured to use a state machine to process the first data frames based on the first communication protocol.

18. The PLC device of claim 15, wherein the transmitter is configured to use a first state machine to transmit the first data frames based on the first communication protocol, comprising restarting segmentation retransmission at starting points and using a MAC payload length.

19. The PLC device of claim 13, wherein the receiver and the transmitter are integrated in a transceiver.

20. A non-transitory computer readable storage medium storing a program for execution by a processor, the program including instructions to:
receive a first signal from a first neighbor device;
determine a first communication protocol of the first signal to be power line communication (PLC) G3 or Institute of Electrical and Electronics Engineers (IEEE) 1901.2;
transmit first data frames to the first neighbor device, using the first communication protocol;
receive a second signal from a second neighbor device;
determine a second communication protocol of the second signal to be PLC G3 or IEEE 1901.2, wherein the first communication protocol is different from the second communication protocol; and
transmit second data frames to the second neighbor device, using the second communication protocol.

* * * * *